UNITED STATES PATENT OFFICE.

CHARLES E. WALLER, OF ALLENTOWN, PENNSYLVANIA, ASSIGNOR, BY MESNE ASSIGNMENTS, TO TROJAN POWDER COMPANY, OF NEW YORK, N. Y., A CORPORATION OF NEW YORK.

NITROSTARCH EXPLOSIVE.

1,386,478.     Specification of Letters Patent.     Patented Aug. 2, 1921.

No Drawing. Application filed January 15, 1919, Serial No. 271,310. Renewed January 21, 1921. Serial No. 439,056.

*To all whom it may concern:*

Be it known that I, CHARLES E. WALLER, a citizen of the United States, and resident of Allentown, Lehigh county, Pennsylvania, have invented certain Improvements in Nitrostarch Explosives, of which the following is a specification.

My invention relates to nitro-starch explosives, and its object is the production of an explosive of high brisance and non-inflammability, and to lessen the danger of manufacture.

I have discovered that if water be added to nitro-starch to reduce the inflammability of the latter, and the proportions be properly regulated, the increase in density fully offsets any reduction of energy due to the addition of water, so that by comparing wet and dry nitro-starch bulk to bulk, the former can be made to produce a higher explosive effect than the latter.

I have further discovered that if a water soluble salt such as ammonium nitrate be added to the wet nitro-starch, the density of the latter can be still further increased, the freezing point considerably reduced, and the ready evaporation of the water when the mixture is exposed to the air can be prevented.

As an example of an explosive mixture embodying my invention, I instance the following:

| | |
|---|---|
| Nitro-starch | 65% |
| Water | 15% |
| Ammonium nitrate | 20% |
| | 100% |

I may make up this mixture by adding twenty parts of dry ammonium nitrate to eighty parts of nitro-starch containing 18.75% moisture.

The particular proportions of the several ingredients referred to may be varied somewhat. In order to get the best results the percentage of water should be more than 10% and may even be more than 15%, and ammonium nitrate should be more than 10% and may be as high as 20%, as in the example given. In any event the percentage of ammonium nitrate and water present will be substantial, being not less than approximately 20% of the entire mixture.

In the manufacture of the explosive aforesaid, I have found that if the mixture has any tendency to dry out upon exposure to a dry atmosphere, this tendency may be overcome by the addition of a small quantity of calcium nitrate, a salt of high deliquescence. I have used successfully calcium nitrate in the proportion of from 4% to 8% of the entire mixture.

As an example of the mixture including calcium nitrate, I instance the following:—

| | |
|---|---|
| Nitro-starch | 65% |
| Ammonium nitrate | 14% |
| Calcium nitrate | 6% |
| Water | 15% |
| | 100% |

Comparing this mixture with that given above, it will be seen that a portion of the ammonium nitrate has been replaced by calcium nitrate.

This mixture may be made by adding to 76 parts nitro-starch containing 14.5% moisture, ten parts of a 60% calcium nitrate solution in water, and 14 parts of dry ammonium nitrate.

Here again the proportions of the ingredients may be varied, and I have obtained success with mixtures containing nitro-starch from 60 to 70%, ammonium nitrate 19 to 9%, calcium nitrate 4 to 8%, water 17 to 13%.

It will also be understood that in utilizing the explosive described, it can be incorporated with a suitable carbonaceous or combustible ingredient, in accordance with the practice in this art.

I claim:

1. An explosive comprising nitro-starch, ammonium nitrate, calcium nitrate and water, substantially as and for the purpose described.

2. An explosive consisting of nitro-starch, ammonium nitrate, calcium nitrate and water.

3. An explosive consisting of from 60% to 70% nitro-starch, 19% to 9% ammonium nitrate, 4% to 8% calcium nitrate, and 17% to 13% water.

4. An explosive consisting of nitro-starch approximately 65%, ammonium nitrate approximately 14%, calcium nitrate approximately 6% and water approximately 15%.

5. An explosive comprising nitro-starch, ammonium nitrate, water and calcium nitrate, the last named ingredient representing approximately 4% to 8% of the entire mixture.

CHARLES E. WALLER.